Sept. 14, 1965   I. L. GOULD ETAL   3,205,666
REFRIGERATING APPARATUS
Filed Oct. 9, 1963   4 Sheets-Sheet 3

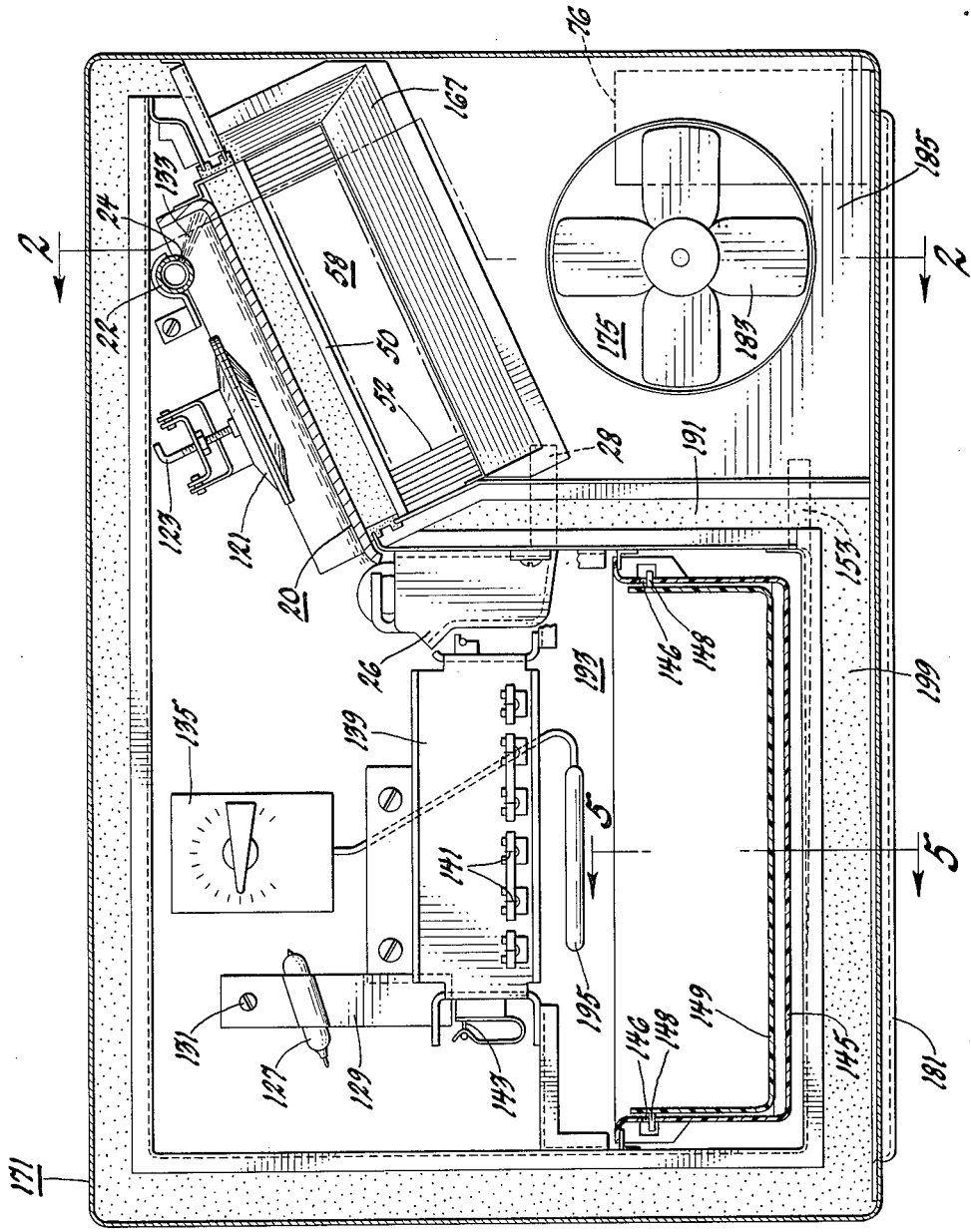

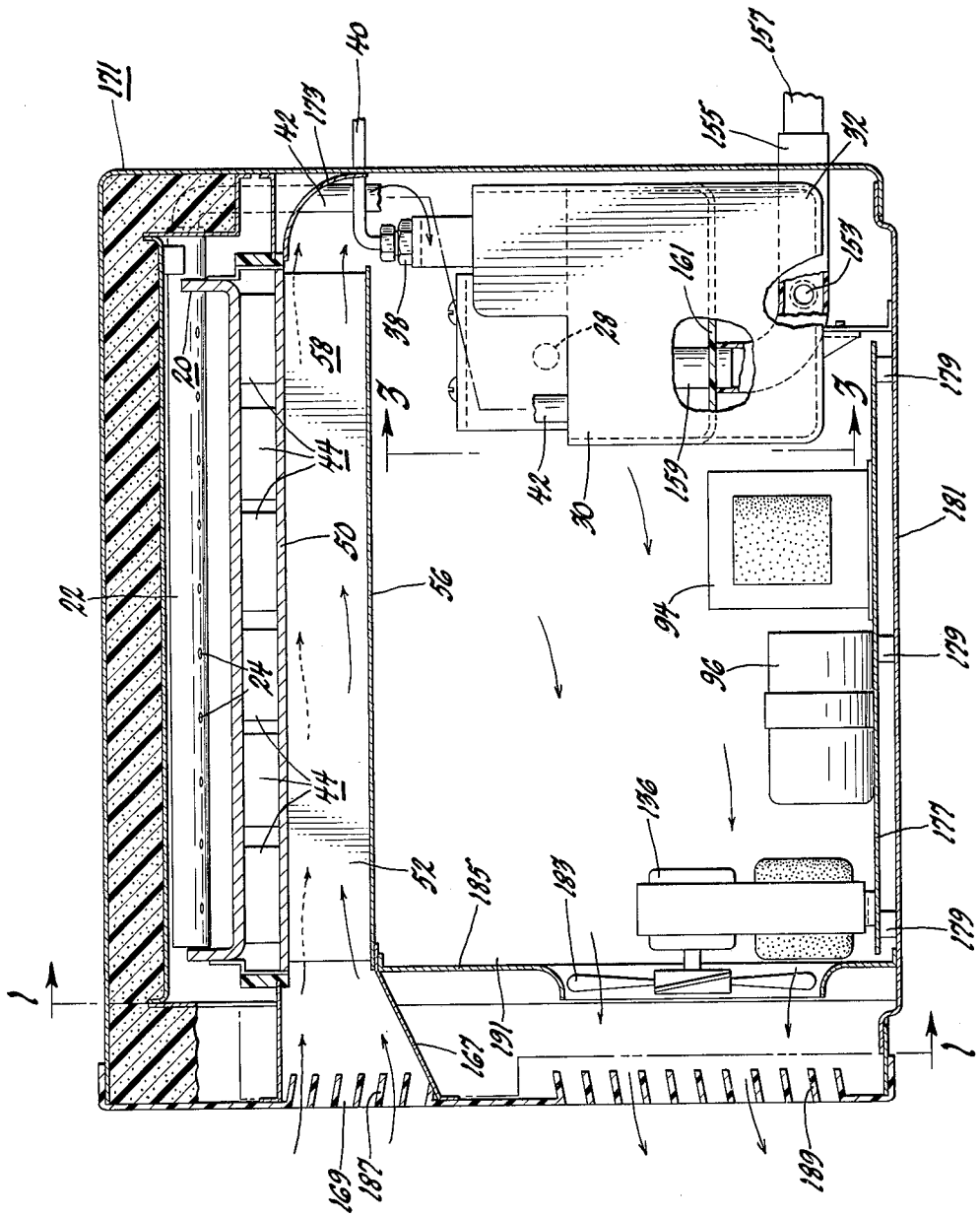

INVENTORS
Ira L. Gould
Keith K. Kesling
Arthur T. Bassett, Jr.
BY
Carl A. Stickel
THEIR ATTORNEY Sept. 14, 1965     I. L. GOULD ETAL     3,205,666
REFRIGERATING APPARATUS
Filed Oct. 9, 1963     4 Sheets-Sheet 4

INVENTORS
Ira L. Gould
Keith K. Kesling
Arthur T. Bassett, Jr.
BY
Carl A. Stichel
THEIR ATTORNEY

United States Patent Office 3,205,666
Patented Sept. 14, 1965

3,205,666
REFRIGERATING APPARATUS
Ira L. Gould, Hamilton, and Keith K. Kesling and Arthur T. Bassett, Jr., Dayton, Ohio, assignors to General Motors Corporation, Detroit, Mich., a corporation of Delaware
Filed Oct. 9, 1963, Ser. No. 315,039
4 Claims. (Cl. 62—3)

This invention pertains to refrigerating apparatus and more particularly to automatic ice makers.

Except for the well known freezing of ice in trays, the making of ice is complicated and automatic ice makers are largely complicated and expensive. Part of the complication and bulk is caused by the mechanical refrigerating system customarily used for freezing the ice.

It is the object of this invention to provide a small compact automatic ice maker which is efficiently cooled by a thermoelectric system.

It is another object of this invention to provide an improved efficient thermoelectric system for making ice from flowing water.

It is another object of this invention to provide a small ice maker having an improved compact ice collecting storage and removal arrangement.

It is another object of this invention to provide a more efficient air cooling system for a thermoelectric system.

It is another object of this invention to provide an improved, more efficient air guiding means for guiding the air into heat transfer relation with a finned heat rejection part of a thermoelectric system.

These and other objects are attained in the form as shown in the drawings in which during the freezing cycle water flows continuously over a freezing plate which is cooled by a plurality of thermoelectric modules having their cold junction in heat transfer relation with the side of the plate opposite the flowing water and which have their hot junctions in heat transfer relation with a finned heat sink plate. The thermoelectric modules and the plates and the fins are firmly clamped together by screws extending into threaded bosses on the plate to provide good heat transfer and high efficiency. An air duct surrounds the fins and is provided with a high efficiency entrance to the finned section. A fan draws in air through this high efficiency entrance and through the fins and thereafter circulates the air over the remaining heat dissipating elements of the electrical system associated with the thermoelectric system.

A pump continuously recirculates water substantially uniformly over the freezing plate. Clear ice will then freeze on the plate and when it reaches a predetermined thickness, a reversing switch is operated to reverse the current flow through the thermoelectric modules to change the cold junction to a hot junction while the fan and pump are stopped. The stopping of the fan increases the heating rate of the reversed current flow in the thermoelectric elements applied to the freezing plate so that the ice slides off onto a grid which includes electrically heated wires for cutting the slab of ice into square pieces. These pieces fall into an open front storage bin which has its front closed by a drawer having a scooping rear edge in the place of a rear wall. The deposit of the slab of ice upon the heated wire grid operates a switch which returns the system to normal freezing operation. During the heating of the plate the circulating water is discharged to a drain to discard the impurities so that clear ice will always be produced. This is accomplished through a syphoning system which automatically drains the tank when the circulating pump stops. A thermostat responsive to bin temperature stops the operation of the system when the bin is substantially filled with pieces of ice.

Further objects and advantages of the present invention will be apparent from the following description, reference being had to the accompanying drawings wherein a preferred embodiment of the present invention is clearly shown.

In the drawings:

FIGURE 1 is a vertical sectional view taken along the lines 1—1 of FIGURE 2 of a compact thermoelectric ice maker embodying one form of our invention.

FIGURE 2 is a vertical sectional view taken along the line 2—2 of FIGURE 1.

Figure 3:
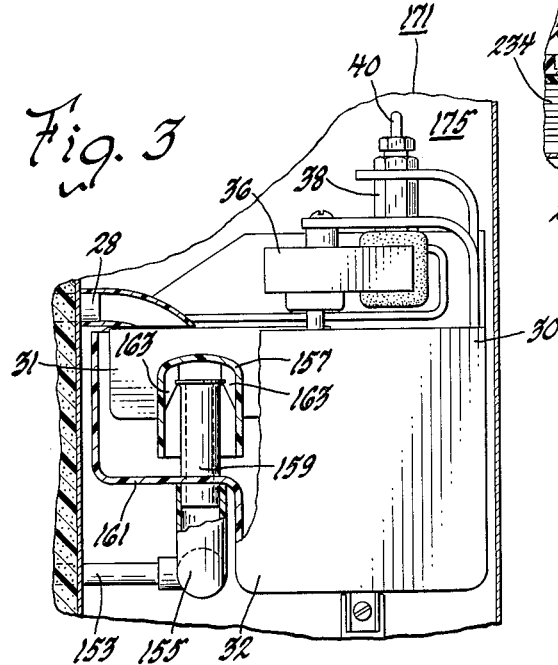
FIGURE 3 is a sectional view partly in elevation taken substantially along the lines 3—3 of FIGURE 2.

Referring now to the drawings and more particularly to FIGURE 1, there is shown an ice maker provided with a flanged freezing plate 20 of anodized aluminum which is slightly inclined. It has flanges on the sides and the upper edge and a curled lower edge. Adjacent the upper end is a horizontal supply pipe 22 extending parallel to the upper edge and having distributed apertures 24 which uniformly distribute a supply of water across the upper edge of the plate. This water in a substantially uniform sheet continuously flows down the inclined plate into a collecting trough 26 provided with an outlet tube 28 discharging into the tank 30. This tank 30 includes a sump 32 having in its bottom portion a gear or other type pump 34 driven by the electric motor 36. The tank 30 includes a float 31 (FIGURE 3) controlling an inlet valve 38 which controls the flow of water from a supply source through the supply pipe 40 into the tank 30. The pump 34 pumps water through the pipe 42 to the perforated distributing tube 22 as long as the freezing cycle continues.

Figure 6:
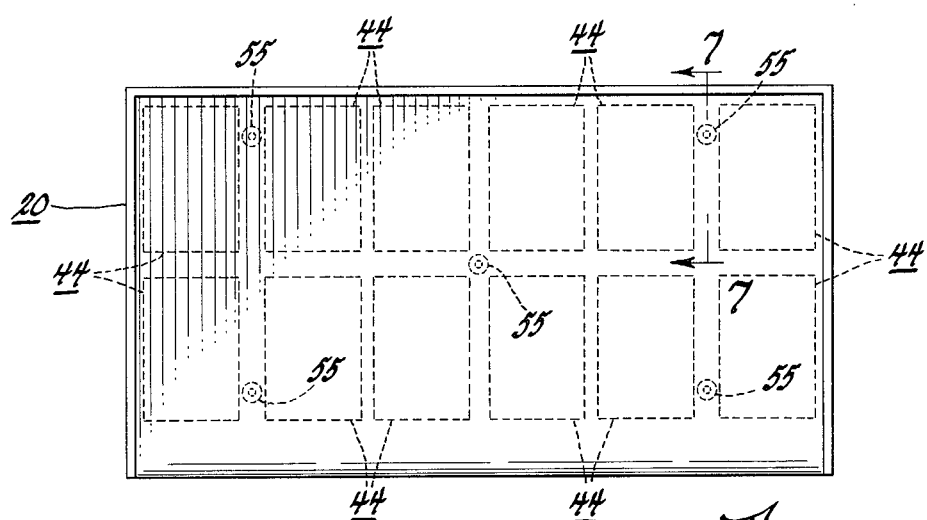
FIGURE 6 is a plan view of the freezing plate.
Figure 7:
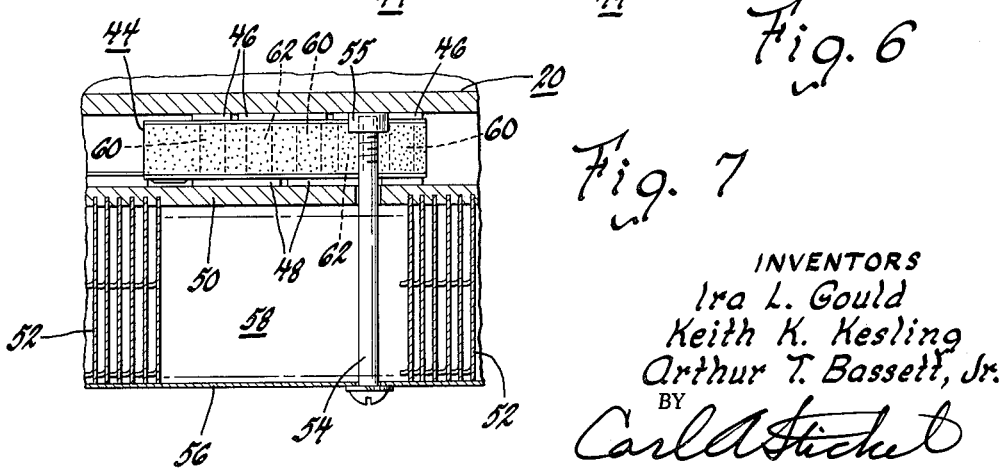
FIGURE 7 is a fragmentary vertical sectional view of the thermoelectric apparatus taken along the lines 7—7 of FIGURE 6.

The freezing plate 20 is cooled by an efficient thermoelectric system which includes 12 identical thermoelectric modules 44 positioned as shown in FIGURES 2, 6, and 7. These Thermoelectric modules have their cold junctions 46 in substantial contact with the anodized surface on the bottom of the freezing plate 20. The anodized surface is an electrical insulator but is a good heat conductor. If desired, the heat transfer may be improved through the use of viscous heat transfer substance such as petroleum jelly placed in between the cold junctions 46 and the plate 20. The hot junctions 48 may be likewise coated with a viscous heat transfer substance. These hot junctions 48 extend into heat transfer relation with the adjacent surface of an anodized aluminum heat sink plate 50 having grooves on the lower face which receive the heat transfer fins 52.

To clamp all these elements together tightly so as to provide improved heat transfer between the thermoelectric module 44 and the plates 20 and 50, and particularly to hold the fins 52 firmly in contact with the plate 50 and to hold the plate 50 firmly in contact with the hot junctions 48, and also to hold the cold junctions 46 firmly in contact with the lower face of the anodized freezing plate 20 there are provided long clamping screws 54 extending through the wall 56 of an air duct 58 containing the fins 52 and threading into bosses 55 provided on the bottom face of the plate 20. This forces the fins 52 firmly into the grooves in the bottom face of the plate 50. Through this pressing, the plate 50 is also forced firmly against the hot junctions 48. This forces the thermoelectric module and its cold junctions 46 firmly against the bottom of the anodized plate 20. Each of the modules 44 include the P-type thermoelectric elements 60 and the N-type thermoelectric elements 62 which are connected at their opposite ends by the connector bars forming the cold junctions 46 and the hot junctions 48.

Figure 4:
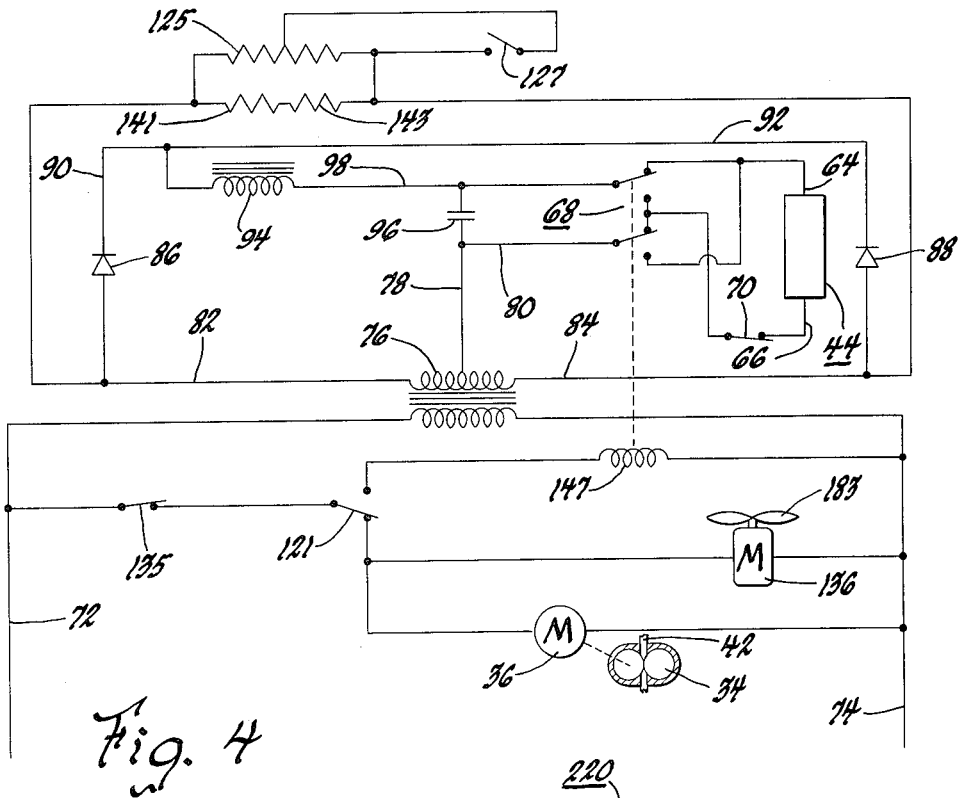
FIGURE 4 is a wiring diagram of the apparatus.

The thermoelectric modules 44 illustrated in FIGURES 2 and 6 are all connected in series and illustrated as a single block in FIGURE 4. The opposite terminals, 64 and 66, of the series connected modules connect to the double throw double pole reversing switch 68. The terminal 64 is connected to the upper and lower stationary contacts of the reversing switch 68 while the terminal 66 is connected through the bin thermostatic switch 70 with the stationary center terminals of the reversing switch 68.

For supplying the thermoelectric modules 44 with power there are provided the supply conductors 72 and 74 which connect to the opposite terminals of the primary winding of the transformer 76. The secondary winding of the transformer 76 has a center tap connected by the conductors 78 and 80 to the lower movable switch member of the reversing switch 68, while the end terminals of the secondary winding connect through the conductors 82 and 84, the rectifiers 86 and 88 and the conductors 90 and 92 to a junction which connects through the choke coil 94 with the upper moveable switch member of the reversing switch 68. A capacitor 96 is connected between the conductor 98 connecting with the upper moveable switch member and the conductor 80 connecting with the lower moveable switch member of the reversing switch 68. Through this arrangement the alternating current power supply is rectified so as to provide a satisfactory direct current for the energization of the thermoelectric modules. When the reversing switch 68 is in the position shown, the thermoelectric modules 44 will cool the plate 20 for freezing water thereon.

As shown in FIGURE 1 above the freezing plate 20 there is provided an adjustable double throw thermostatic switch 121 which may have a screw adjustment 123 for moving the thermostat 121 toward or away from the plate 20. This thermostat 121 is provided with an electric heater 125 which is associated with the thermostat 121 so as to normally keep its temperature above freezing. This double throw thermostatic switch 121 is diagrammatically shown in FIGURE 4. A mercury switch 127 has its opposite terminals connected to the center tap and one of the end terminals of the heater 125. As shown in FIGURE 1, this mercury switch 127 is mounted upon a lever 129 pivoted at its upper end on the pivot pin 131. The heater 125 normally supplies only sufficient heat to the thermostat 121 to keep the thermostat 121 from operating while it is being contacted by the water 133 which flows over the congealed liquid on the plate 20. However, when the ice or other congealed liquid is frozen or congealed upon the plate 20 to a thickness sufficient to cause it to contact the thermostat 121, the transmission of the heat from the thermostat 121 to the freezing plate 20 will be sufficient to cause the thermostat 121 to be operated from the position shown in FIGURE 4 to its upper position.

In its upper position, current is transmitted from the supply conductor 72 through the bin thermostat 135 to the moveable double throw contact of the thermostat switch 121. When the double throw switch 121 is operated from the lower position as shown in FIGURE 4, to its upper position, the pump motor 36 as well as the fan motor 136 will be deenergized while the solenoid coil 147 will be energized to operate the double throw switch members of the double throw switch 68 from the upper position to the lower position. This will reverse the current flow through the thermoelectric modules 44 so that the upper cold junction in heat transfer with the plate 20 will now become a hot junction, while the former lower hot junction will become a cold junction. This will deenergize the fan 136 and the pump motor 36. The deenergization of the fan 136 will stop the cooling air flow of current for the former hot junction and will cause the temperature of this former hot junction to rise thereby causing a temperature rise of the former hot junction. The thermoelectric elements 60 and 62 are capable of maintaining a substantial difference in temperature between the heat sink aluminum plate 50 and the freezing plate which is now changed to a heat dissipating plate 20. Consequently the shutting off of the pump motor 36 will cause an increase in the temperature of the former cold junction so that the temperature will be quickly raised in a very efficient manner to release the slab of ice frozen on the anodized surface of the plate 20. This will melt the bond between the slab of ice and the upper surface of the plate 20 so that the slab of ice will then slide off the plate 20 onto the grid 139.

Figure 5:
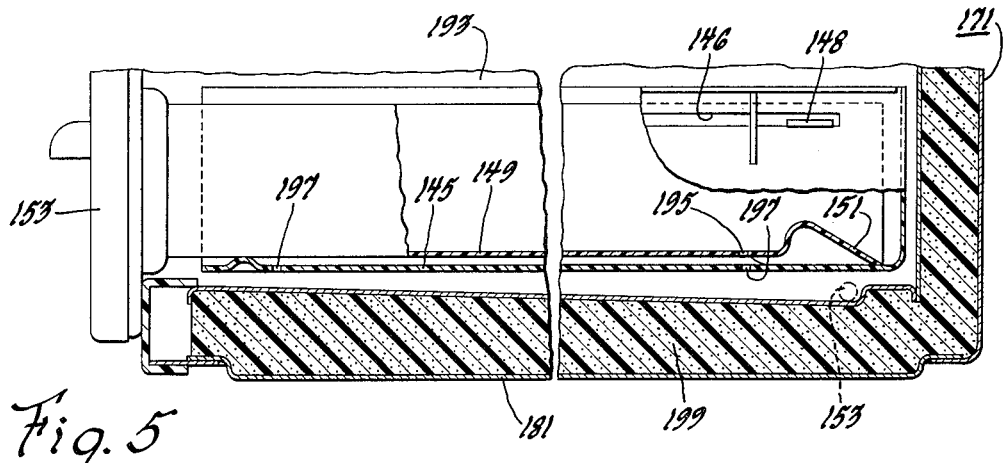
FIGURE 5 is a fragmentary vertical sectional view taken along the lines 5—5 of FIGURE 1.

The grid 139 includes a set of fore and aft wires 141 which are looped around electrical insulating pins supported on the outside of the grid member 139. The grid 139 also includes lateral wires 143 extending laterally across so that the slab of ice deposited thereon will be quickly cut by the heated wires into a plurality of small cubes. Beneath the grid 139 is an open front bin 145 having rear and sidewalls but no front wall. Slidably mounted within the bin 145 is a drawer 149 which has a drawer front, side and bottom walls but which does not have a rear wall. Instead of having a rear wall, the drawer 147 is provided with a scoop shaped rear edge 151 which whenever the drawer front 153 is pulled out, ice pieces will be caught either by the ice bin 145 or the drawer 147 whenever the drawer 147 is pulled out or removed. When the drawer 147 is again pushed in, the scoop 151 at the rear edge will move underneath the pile of ice and cam the ice through the scoop edge 151 onto the floor or bottom of the drawer 147. The sides of the bin 145 are each provided with a horizontal slot 146 into each of which projects a tongue 148 extending outwardly from the sides of the drawer 145 to limit its outward movement. In this way the drawer 145 may be readily removed to remove the ice deposited therein and when not being used it may remain in the freezing compartment as illustrated in FIGURE 5.

The bottom of the drawer 149 is provided with a transverse row of apertures 195 for draining water from the ice cubes. The bin 145 has front and rear sets of transverse rows of drain apertures 197. The insulated bottom wall 199 catches the drainage from the bin 145 and is sloped to the rear so as to drain to the tube 153 which drains into the L-shaped discharge tube 155. The bin compartment 193 is also provided with insulated front, rear, side and top walls. The L-shaped tube 155 connects to the drain conduit 157. The upper end of the elbow-shaped tube 155 connects with a tube 159 extending upwardly through the raised wall portion 161 of the tank 30, which has an opening at the top capped by an inverted cup-shaped plastic member 157. The cap-shaped member 157 has a pair of inwardly extending ribs 163 provided with notches which snap over the rim at the upper end of the tube 159 to hold the cap-shaped member 157 firmly in place.

When the motor 36 and the pump 34 are stopped at the end of the freezing of a slab of ice, the tank 30 will be quickly filled with the water in the recirculating circuit which is returned to the tank 30 through the tube 28. This will raise the level of the water in the tank 30 above the top of the tube 159 so that the water will be discharged down through the tube 159 and the L-shaped tube or elbow 155 to the drain. The cap-shaped member 157 cooperates with the tube 159 to form a syphon which will continue to discharge water through the tube 159 from the tank 30 by syphoning it over the upper end of the tube 159 until the level of the water in the tank 30 is reduced to the level of the bottom of the cap 157. This prevents the concentration of impurities in the recirculating water and so prevents the ice frozen in the form of a slab on the plate 20 from being cloudy and assures the continuous production of clear ice.

An air circulating system is provided for cooling the fins 52 and the heat dissipating electrical components constituting the power pack for converting the alternating current supply to suitable direct current for the thermoelectric modules 44. This air circulating system includes the duct 58 which encloses the fins 52. The efficiency of the air circulation is improved by as much as 70% by providing a converging duct section 167 between the duct entrance 169 and the front of the portion of the duct 58 containing the fins 52. The fins 52 in the duct 58 extend laterally beneath the anodized aluminum heat sink plate 50 to the rear of the insulated cabinet 171. At the rear of the cabinet 171 is provided with a curved sheet metal piece 173 which directs the air downwardly into an apparatus compartment 175. At the bottom of the apparatus compartment 175 is a platform 177 which is raised upon the rubber mountings 179 above the bottom 181 of the cabinet 171. Supported on this platform 177 are the fan motor 136, the condenser 96, the choke coil 94, and the transformer 76 (which appears only in FIGURE 4). The double throw double pole relay 68, 147, as well as the rectifiers 86 and 88 may also be mounted on the platform 177. The air circulates beneath the platform 177 and around the various heat dissipating electrical elements in the compartment 175 including the pump motor 36 to efficiently carry the heat outside the cabinet. The fan motor 136 drives the propeller fan 183 which rotates within the shroud 185 in the front of the compartment 175. The front of the cabinet is provided with an upper set of louvres 187 for the air entrance 169 and a lower set of louvres 189 through which the fan 183 discharges the air. The cabinet 171 includes an insulated partition wall 191 dividing the apparatus compartment 175 from the bin compartment 193 which contains the grid 139, the bin 145 and the drawer 149. When these are filled with ice, the bulb 195 will be cooled sufficiently to operate the switches 135 and 70 to open position to deenergize the pump and fan motors 36 and 136 and the thermoelectric modules 44. The switch 135 in FIGURE 1 includes the additional switch 70 (FIGURE 4) operated simultaneously in a double pole arrangement according to the temperature of the bulb 195.

Figure 8:
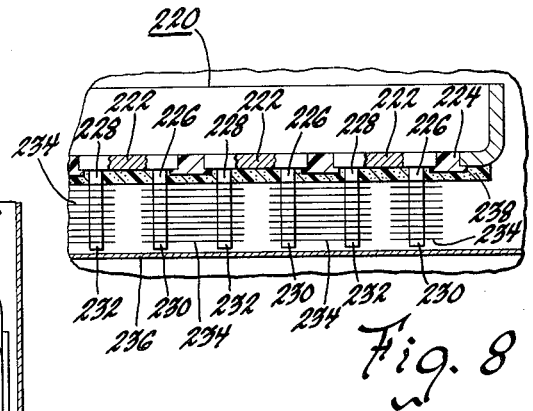
FIGURE 8 is a fragmentary sectional view of a modified form of freezing plate and thermoelectric system.

In FIGURE 8 a modified form of freezing plate 220 is provided. In this form of plate the connector bars 222 of copper or other suitable material form the surfaces on which individual pieces of ice are frozen. These bars 222 are insulated from each other by electrically insulating plastic material 224 which may be cast around the connector bars 222. The connector bars 222 connect the P-type thermoelectric materials 226 with the N-type thermoelectric materials 228. These thermoelectric materials 226 and 228 are provided with thermally conductive rods or extensions 230 and 232. These extensions conduct heat downwardly from the thermal electric materials 226 and 228. These extensions are joined by the cross fins 234 which transmit the heat to the air flowing in the duct formed by the wall 236. The cross fins 234 also serve as electrical connectors between the extensions 230 and 232. The thermal electric materials 226 and the spaces in between are surrounded by a layer of foam insulating plastic material 238 which insulates the air in the duct 236 from the cold junctions provided by the connector bars 222. This form of plate 220 is operated similarly to the plate 20 and the machine illustrated in FIGURES 1–7 excepting that no grid is required to cut a slab of ice into pieces since separate pieces of ice will be formed on each connector bar.

While the embodiment of the present invention as heredisclosed, constitutes a preferred form, it is to be understood that other forms might be adopted.

What is claimed is as follows:

1. An ice maker including a freezing plate, thermoelectric means having a cold junction in heat transfer with the lower face of said freezing plate and having a hot junction spaced from and insulated from the freezing plate, electrical means for changing an alternating current input to a direct current output for supplying said thermoelectric means with direct current, means for flowing a liquid to be congealed over said plate to congeal the liquid, means comprising a fan for circulating a cooling medium first into heat transfer relation with said hot junction and thereafter in heat transfer relation with said electrical means, and means including a reversing switch means responsive to a selected congealing of liquid on said freezing plate for changing said cold junction to a hot junction and an additional control operable coincidentally to the reversing switch for stopping said fan for stopping the circulation of said cooling medium to increase the temperature of the air.

2. An ice maker including a freezing plate, thermoelectric means having a cold junction in heat transfer with the lower face of said freezing plate and having a hot junction spaced from and insulated from the freezing plate, electrical means for changing an alternating current input to a direct current output for supplying said thermoelectric means with direct current, means forming an air duct means extending into heat transfer relation with said hot junction and with said electrical means, and means for circulating air through said air duct means first into heat transfer relation with said hot junction and thereafter into heat transfer relation with said electrical means, and means including a reversing switch means for changing said cold junction to a hot junction and for coincidentally stopping the circulation of air through said air duct means to increase the temperature of the air.

3. An ice maker including a freezing plate, thermoelectric means having a cold junction in heat transfer with the lower face of said freezing plate and having a hot junction spaced from and insulated from the freezing plate, electrical means for changing an alternating current input to a direct current output for supplying said thermoelectric means with direct current, means for flowing a liquid to be congealed over said plate to congeal the liquid, means forming an air duct means extending into heat transfer relation with said hot junction and with said electrical means, said air duct means including fin means extending into heat transfer relation with said hot junction, said air duct means comprising an air entrance and a converging portion extending from said air entrance to said fin means, said air entrance being provided with a grille, and means for circulating air through said air duct means first into heat transfer relation with said hot junction and thereafter into heat transfer relation with said electrical means.

4. An ice maker including a freezing plate having a poor electrically conducting surface, thermoelectric means comprising a thermoelectric array having cold junctions in heat transfer with said poor conducting surface of said freezing plate and having hot junctions, a heat sink plate having a poor electrically conducting surface in heat transfer with said hot junctions and having a plurality of narrow grooves on the opposite surface, a plurality of fins each having one edge in contact with and lodged in said narrow grooves in the opposite surface of said heat sink plate from that in heat transfer with said hot junctions, a clamping plate in contact with the edge of said fins opposite said one edge, and clamping means for drawing said clamping plate toward said freezing plate to increase the contact pressure between said thermoelectric array and said fins with said plates.

References Cited by the Examiner

UNITED STATES PATENTS

| | | | |
|---|---|---|---|
| 2,682,155 | 6/54 | Ayres | 62—138 |
| 2,839,899 | 6/58 | Baillif | 62—344 |
| 2,860,027 | 11/58 | Swanson | 312—312 |
| 2,943,452 | 7/60 | Buchanan | 62—3 |
| 2,991,628 | 7/61 | Tuck | 62—3 |
| 3,073,126 | 1/63 | Staebler | 62—3 |
| 3,077,079 | 2/63 | Pietsch | 62—3 |
| 3,088,289 | 5/63 | Alex | 62—3 |

WILLIAM J. WYE, *Primary Examiner.*